(12) United States Patent
Reviel

(10) Patent No.: US 9,420,887 B2
(45) Date of Patent: Aug. 23, 2016

(54) DETACHABLE SHELF WITH SWIVEL POINT FOR MONITORS

(71) Applicant: Marc Reviel, Cedar Park, TX (US)

(72) Inventor: Marc Reviel, Cedar Park, TX (US)

(*) Notice: Subject to any disclaimer, the term of this patent is extended or adjusted under 35 U.S.C. 154(b) by 0 days.

(21) Appl. No.: 14/189,848

(22) Filed: Feb. 25, 2014

(65) Prior Publication Data

US 2015/0238012 A1 Aug. 27, 2015

(51) Int. Cl.
  *A47B 13/00* (2006.01)
  *A47B 97/00* (2006.01)
  *F16M 13/02* (2006.01)

(52) U.S. Cl.
  CPC .............. *A47B 97/00* (2013.01); *F16M 13/022* (2013.01); *A47B 2097/005* (2013.01)

(58) Field of Classification Search
  CPC .... A47B 83/00; A47B 96/061; A47B 57/045; A47B 21/0314; A47B 2200/0089; A47B 2063/005; A47B 97/00; A47B 97/005; G06F 1/1605; G06F 1/1607; G06F 1/1611; F16M 13/022
  USPC ..................... 108/157.1, 157.11, 42; 248/918; 312/7.2; 361/679.23, 679.24, 679.25
  See application file for complete search history.

(56) References Cited

U.S. PATENT DOCUMENTS

| | | | | |
|---|---|---|---|---|
| 2,692,174 A * | 10/1954 | Whitehead | ............... | 108/157.11 |
| 2,986,437 A * | 5/1961 | Davis | ....................... | 108/157.13 |
| 3,930,701 A * | 1/1976 | Otakie | .......................... | 312/244 |
| 3,983,821 A * | 10/1976 | Kearns | .................... | A47B 23/00 108/42 |
| 4,913,393 A * | 4/1990 | Wood | ....................... | A61G 5/10 224/407 |
| 5,292,099 A * | 3/1994 | Isham | ................... | A47B 21/045 248/278.1 |
| 5,357,873 A * | 10/1994 | Hilton | ..................... | A47B 21/00 108/50.01 |
| 5,615,854 A * | 4/1997 | Nomura | ................. | F16M 11/10 248/205.3 |
| 5,639,060 A * | 6/1997 | Spoonts | ................. | F16M 13/02 211/88.01 |
| 5,697,594 A * | 12/1997 | Adams | .................. | A47B 21/045 24/331 |
| 5,727,759 A * | 3/1998 | Christensen | ............. | A47C 7/68 248/118 |
| 5,738,320 A * | 4/1998 | Matos | ................... | A47B 81/061 108/1 |
| 5,775,046 A * | 7/1998 | Fanger | ..................... | A47B 1/06 108/157.16 |
| 5,954,208 A * | 9/1999 | Schultz | ........................ | 211/13.1 |
| 6,100,942 A * | 8/2000 | Hollenbaugh | ......... | G06F 1/1607 248/220.22 |
| 6,138,966 A * | 10/2000 | Smith | ........................ | 248/176.1 |
| 6,170,408 B1 * | 1/2001 | Gombrich | ....................... | 108/90 |
| 6,332,407 B1 * | 12/2001 | Vardaro | .................. | A47B 21/00 100/92 |
| 6,418,010 B1 * | 7/2002 | Sawyer | .................... | 361/679.05 |
| 6,600,827 B2 * | 7/2003 | Lu | ........................... | G06F 1/1605 248/316.4 |
| 6,773,060 B2 * | 8/2004 | Sher | ................... | A47B 21/0314 248/918 |

(Continued)

*Primary Examiner* — Hanh V Tran
(74) *Attorney, Agent, or Firm* — Scheinberg & Associates, PC; Michael O. Scheinberg

(57) ABSTRACT

A detachable shelf can be positioned either on top, bottom, left, or right side of the monitor. The shelf has a flat portion that is horizontal for holding various items. One embodiment of the shelf allows for one or multiple attachment points allowing the shelf to position with the horizontal shelving stable and level. In another embodiment of the current invention, the shelf has a pivot axis that allows the shelf to rotate on its axis that allows for the versatility of the detachable shelf to be position on opposite sides of the monitor. The system includes capabilities to convert the shelf for VESA display screens, computer monitors, and other planar viewing device, such as a laptop, or even a tablet that is stationed.

12 Claims, 9 Drawing Sheets

(56) References Cited

U.S. PATENT DOCUMENTS

| | | | | |
|---|---|---|---|---|
| 6,798,457 B2 * | 9/2004 | Boyden | | H04N 7/144 348/14.16 |
| 7,004,596 B2 * | 2/2006 | Merrem | | A47B 21/045 248/442.2 |
| 7,131,688 B2 * | 11/2006 | Steenson | | 297/161 |
| 7,235,738 B2 * | 6/2007 | Horinouchi | | A63F 13/08 174/50 |
| 7,296,696 B2 * | 11/2007 | Brennan | | G06F 1/1607 211/10 |
| 7,341,235 B2 * | 3/2008 | Okamoto | | 248/638 |
| 7,481,170 B2 * | 1/2009 | Sommerfield | | A47B 21/0314 108/103 |
| 7,542,270 B2 * | 6/2009 | Chen | | G06F 1/1605 248/220.22 |
| 7,559,520 B2 * | 7/2009 | Quijano | | F16M 11/00 248/309.1 |
| 7,817,411 B2 * | 10/2010 | Lee | | A47B 21/045 248/442 |
| D635,804 S * | 4/2011 | North | | D6/574 |
| 8,009,414 B2 * | 8/2011 | Ishida et al. | | 361/679.25 |
| 8,015,761 B2 * | 9/2011 | Wainland | | 52/177 |
| 8,020,829 B1 * | 9/2011 | Tamayori | | 248/447.2 |
| 2008/0122937 A1 * | 5/2008 | Lin | | F16M 11/048 348/207.99 |
| 2009/0008349 A1 * | 1/2009 | Kim | | 211/150 |
| 2009/0020047 A1 * | 1/2009 | Noble et al. | | 108/157.1 |
| 2010/0044324 A1 * | 2/2010 | Gerace | | 211/26.2 |
| 2013/0148282 A1 * | 6/2013 | Chen | | G06F 1/1601 361/679.08 |
| 2015/0305502 A1 * | 10/2015 | Wengreen | | A47B 97/00 248/205.3 |

\* cited by examiner

DETACHABLE SHELF WITH SWIVEL POINT FOR MONITORS

TECHNICAL FIELD OF THE INVENTION

The present invention relates to shelves built and designed for TV and computer monitors.

BACKGROUND OF THE INVENTION

This invention relates to a detachable shelf system for securing onto TV monitors, computer monitors, and the like. Computer monitors and flat VESA screen TVs have become commonplace, and are now present in many households. Although there are different types of computers and monitors, they all share the common trend of becoming thinner. Technology has advanced to the point that these monitors can be less than an inch wide. But old traditional TVs were square and boxy, which allowed users to place things, like set-top boxes, remotes, gaming gadgets, and drinks on them. But as these monitors become thinner, less room exists for these accessories.

With advancements in technology, the answer to smaller available space can come in the form of shelving. Shelving allows for monitors to be used in smaller areas, or it allows for more free space for other accessories. Shelves can provide space for remotes, food, drinks, technology accessories, storage device, camera, microphone, speakers, wireless equipment, gaming equipment, and other office supplies and accessories. The monitor does not have to be a TV or computer monitor. It can take shape of a workstation monitor or stationary tablet (such as stationed on a tri-pod), or other viewing devices that has the ability to maintain a stable shelf.

SUMMARY OF THE INVENTION

An object of the present invention is to provide shelf for various equipment, such as a TV or computer monitor, that is positioned either on top, bottom, left, or right side of the monitor. The present invention allows for versatility so that the shelving can be placed in different locations of the monitor with easy adjustments made by the use. There is nothing complex with aspects of the invention. The innovative features that allow for weight bearing aspects of the shelf and the versatility of shelf capable of transformation into different attachment points allow the invention to exceed the expectations of its capabilities in both design and function. The weight bearing aspects and the swivel point both succeed in making conventional detachable shelves more versatile.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

DETAILED DESCRIPTION OF PREFERRED EMBODIMENTS

Embodiments of the present invention are directed to a detachable shelf capable of use with various TV monitors and computer monitors, or other viewing devices, viewing screens, stationary displays, such as pads for exercise equipment. The TV and computer monitors all share an equal likelihood of being stable and thin. By allowing a horizontal resting area for detachable shelves, the shelving must conform to various attachment points and particular designs that allow for such weight bearing potential.

Figure 1:
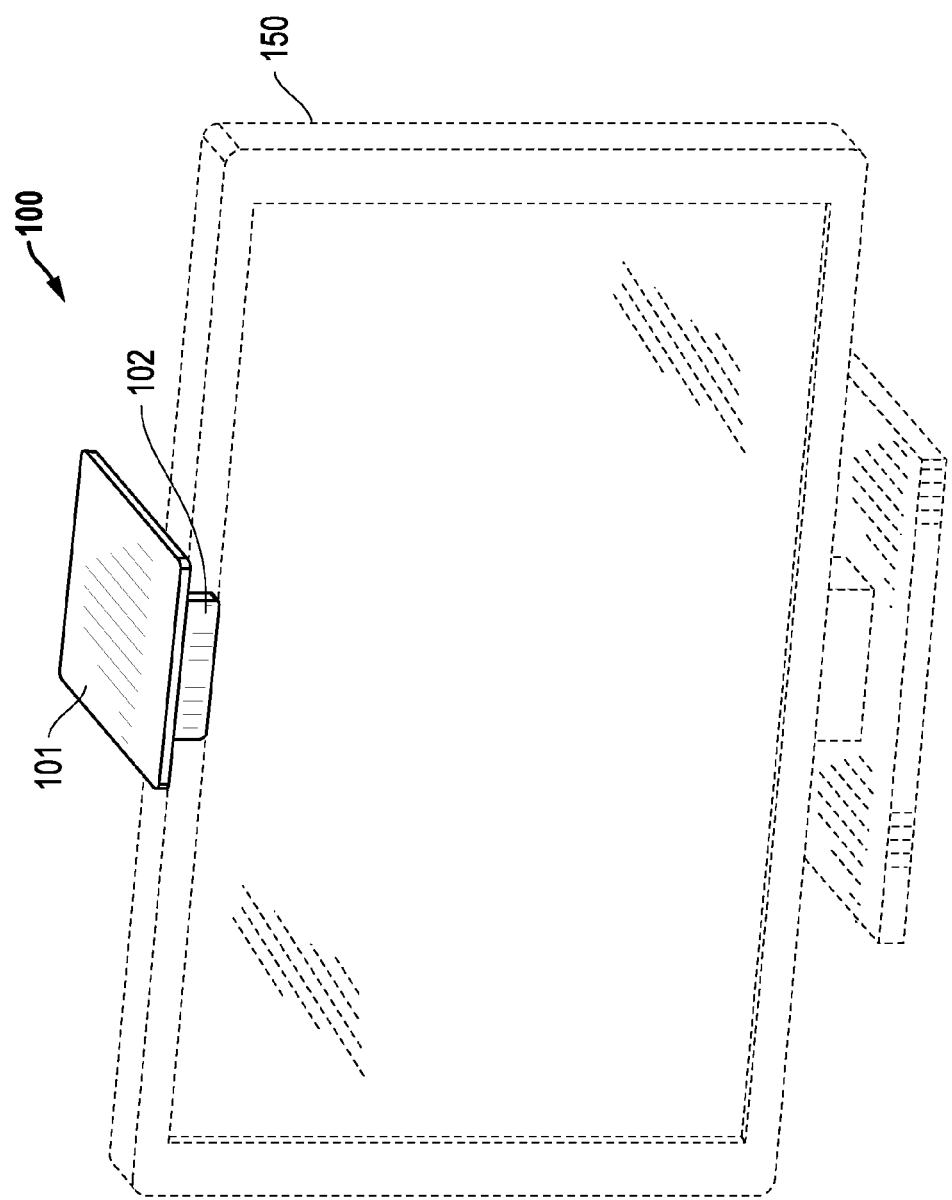
FIG. 1 shows a TV monitor with a detachable shelf on top in accordance with one embodiment of the present invention.

FIG. 1 shows a TV monitor with a detachable shelf 100 on top in accordance with one embodiment of the present invention. It includes a horizontal, flat resting area 101. The materials used for the construction of this resting area can be wood, plastic, polymer, or some form of metal. The only requirement is that is withstands the resiliency of the needed pressure for placement of various items, such as remote controls, on top of the device. The detachable shelf 100 includes an attachment point 102 that attaches to TV or computer monitor 150.

Figure 2:
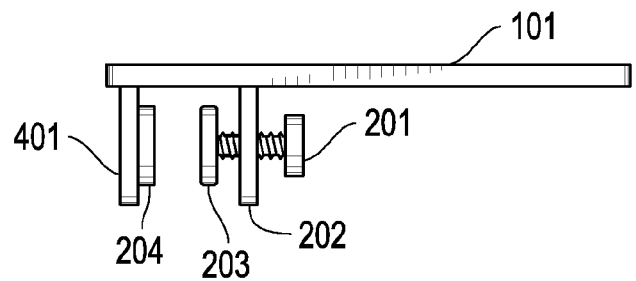
FIG. 2 is a side view of the detachable shelf.
Figure 3:
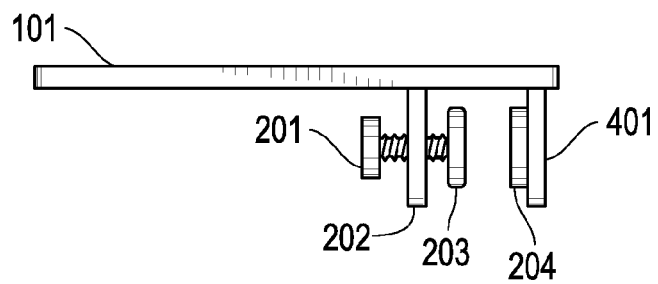
FIG. 3 is another side view of the detachable shelf.
Figure 4:
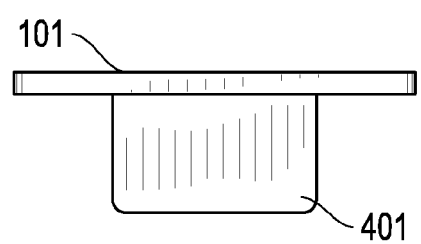
FIG. 4 shows a front perspective of the detachable shelf.
Figure 5:
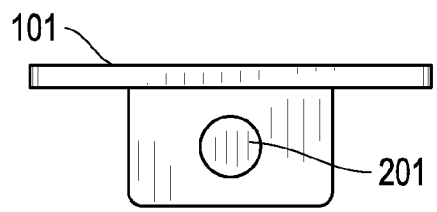
FIG. 5 shows a back perspective of the detachable shelf.
Figure 6:
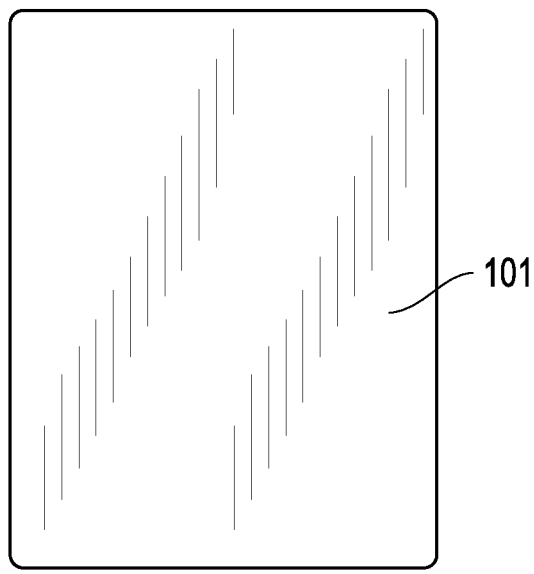
FIG. 6 shows a top perspective of the detachable shelf.
Figure 7:
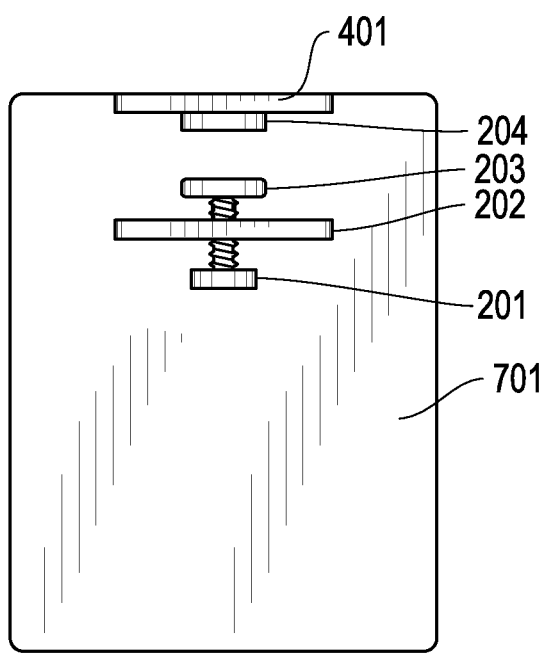
FIG. 7 shows a bottom perspective of the detachable shelf.

FIG. 2 is a side view of the detachable shelf 100. The detachable shelf 100 has one attachment point 203 that includes a tightening mechanism 201. Tightening mechanism can take shape of any form of tightener including a screw or spring tightener. The tightener 201 works with the stabilization of a leg 202 that attaches to the main body detachable shelf 100. The attachment point 203 can be hard that is made of the same material as the body or can made of softer material to not damage the monitor or component. The detachable shelf also includes a pad 204 to prevent the damage of the monitor. FIG. 3 is another side view of the detachable shelf 100 showing the same elements. FIG. 4 shows a front perspective of the detachable shelf 100 showing the front leg 401. FIG. 5 shows a back perspective of the detachable shelf. FIG. 6 shows a top perspective of the detachable shelf 100 showing the top area of the resting area 101. FIG. 7 shows a bottom perspective of the detachable shelf showing the bottom side 701.

Figure 8:
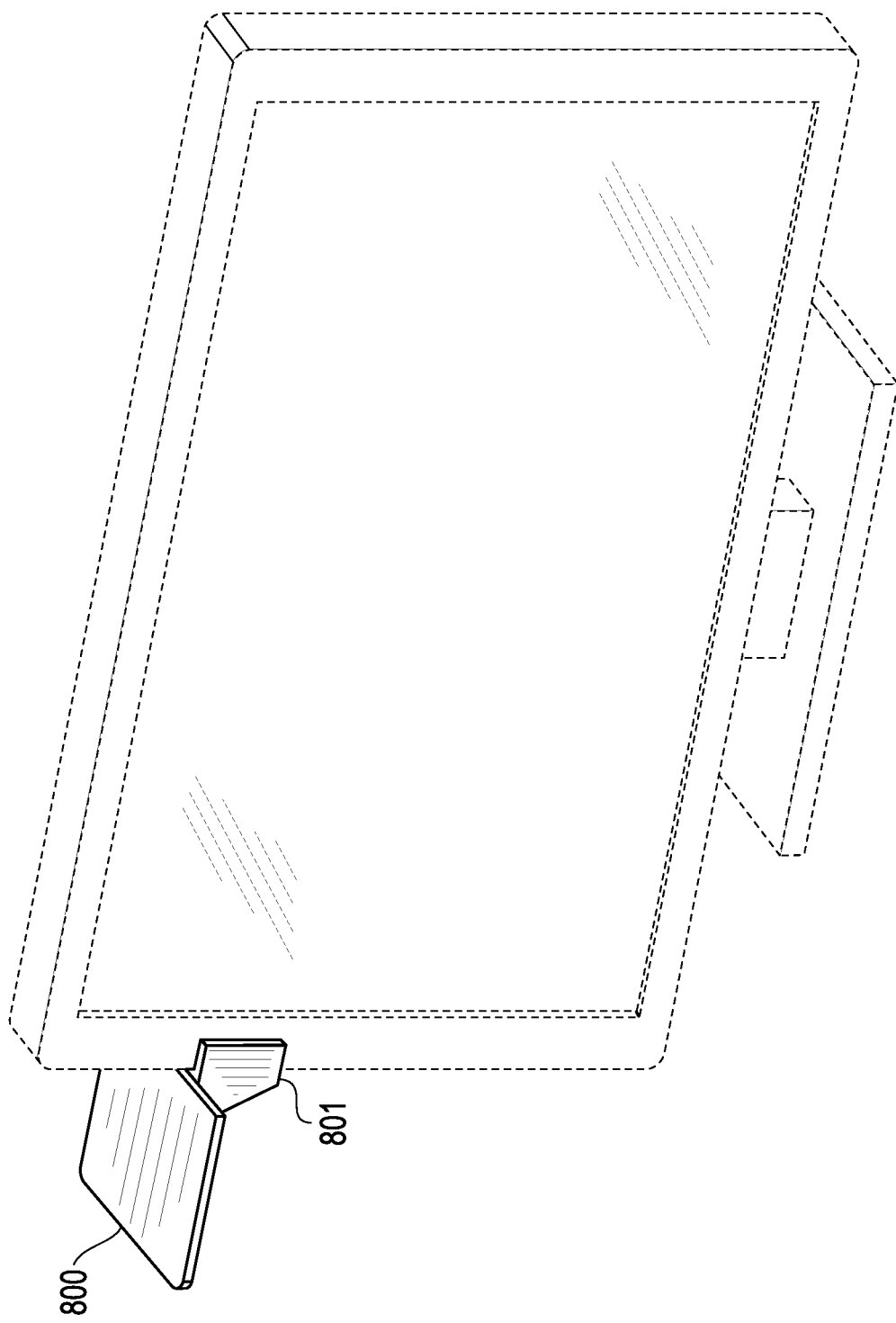
FIG. 8 shows a TV monitor with the detachable shelf attached to the left side.
Figure 9:
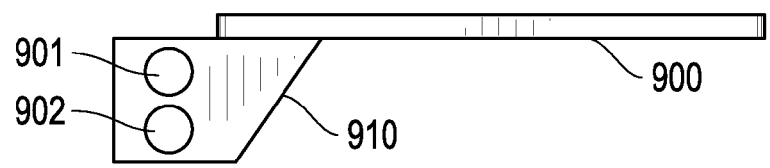
FIG. 9 shows a side perspective of another embodiment of the current invention.
Figure 10:
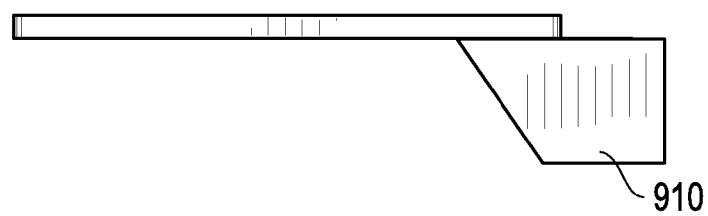
FIG. 10 shows the other side perspective view of embodiment of the current invention.
Figure 11:
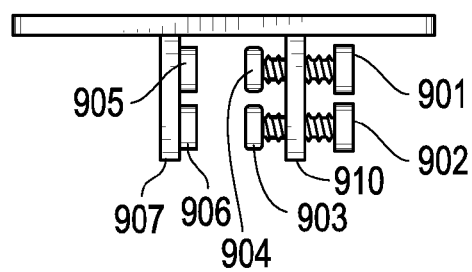
FIG. 11 shows the front view of the embodiment.
Figure 12:
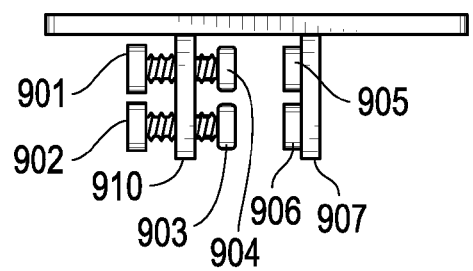
FIG. 12 shows the back view of the embodiment.
Figure 13:
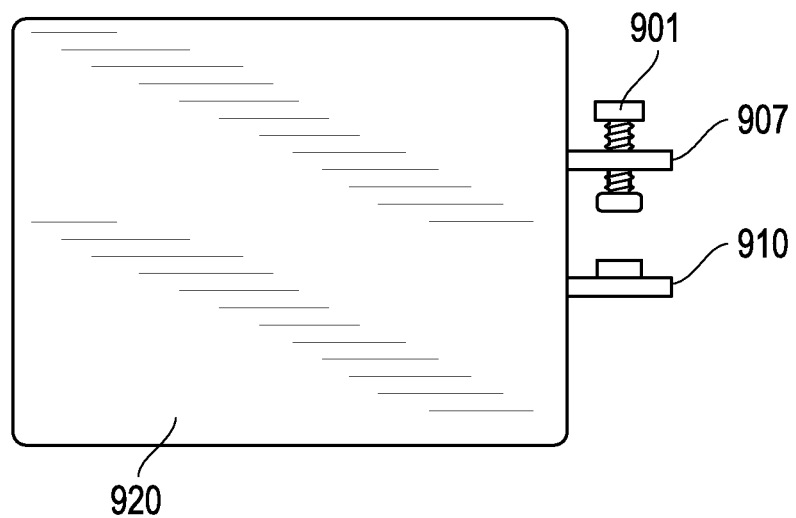
FIG. 13 shows the top view of another embodiment of the current invention.
Figure 14:
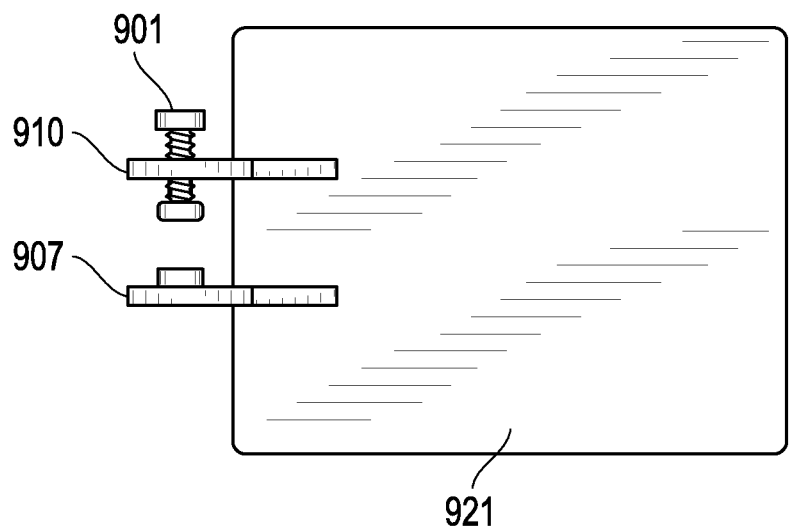
FIG. 14 shows the bottom view of another embodiment of the current invention.

FIG. 8 shows another embodiment of the current invention showing a TV monitor with the detachable shelf 800 attached to the left side of the TV or computer monitor having an attachment point 801. FIG. 9 shows another embodiment of the current invention with two attachment tighteners 901, 902. The attachment tighteners 901, 902 are on the support leg 910 of the detachable shelf 900. The multiple attachment points allow for more stable connections to various surfaces and allows for better dispersement of pressure in the attachment points. FIG. 10 shows the other side perspective view of embodiment of the current invention showing the support leg 910. FIG. 11 shows the front view of the embodiment having attachment tighteners 901, 902 with attachment points 903, 904, and pads 905, 906 and other support leg 907. FIG. 12 shows the back view of the embodiment. FIG. 13 shows the top view of another embodiment of the current invention showing resting area 920. FIG. 14 shows the bottom view of another embodiment of the current invention showing the bottom 921.

Figure 15:
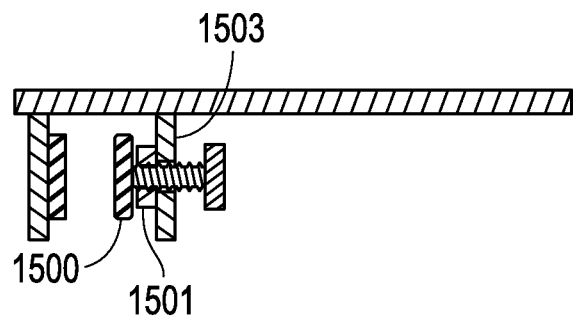
FIG. 15 shows a side view of another embodiment.
Figure 16:
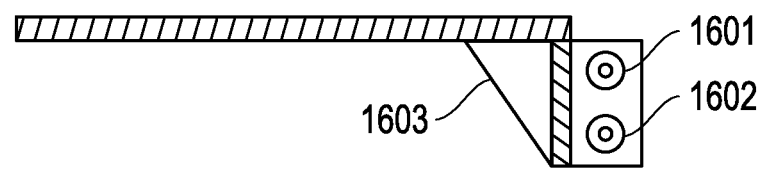
FIG. 16 shows a side view of another embodiment.
Figure 17:
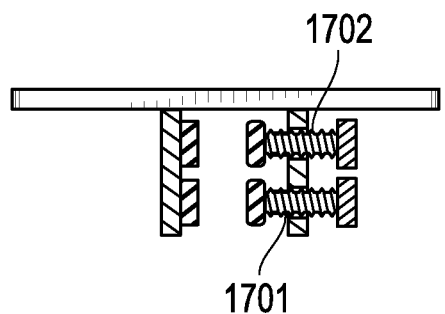
FIG. 17 shows a side view of another embodiment.

FIG. 15 shows a side view of another embodiment showing a pad 1501 between the attachment point 1500 and the support leg 1503. FIG. 16 shows a side view of another embodiment with two attachment tighteners 1601, 1602 and a support arm 1603. FIG. 17 shows a side view of an embodiment of the current invention showing a cross-sectional view of the tighteners at 1701 and 1702.

Figure 18:
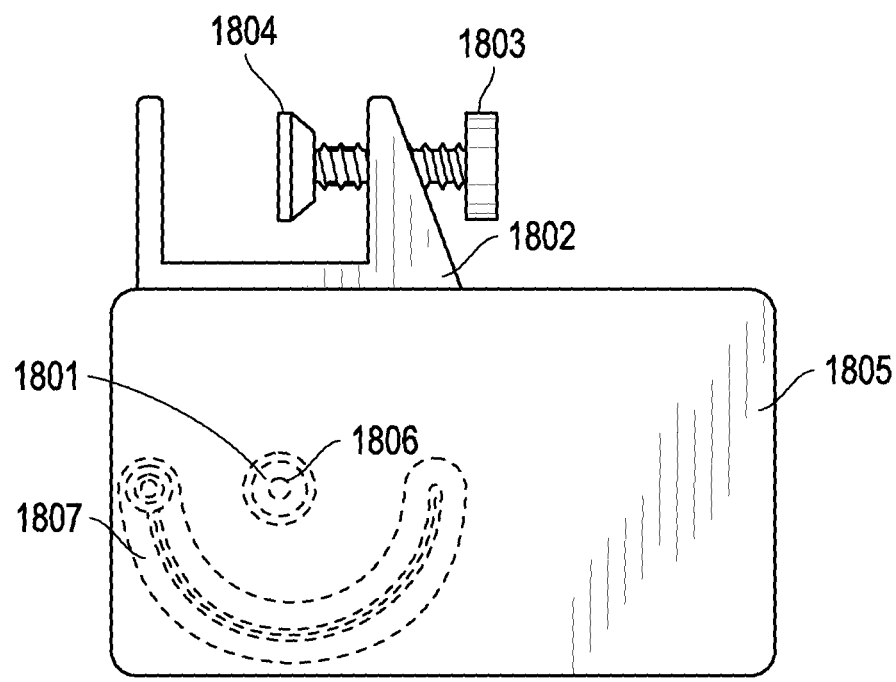
FIG. 18 shows a top view of another embodiment having a swivel point for reversibility.
Figure 19:
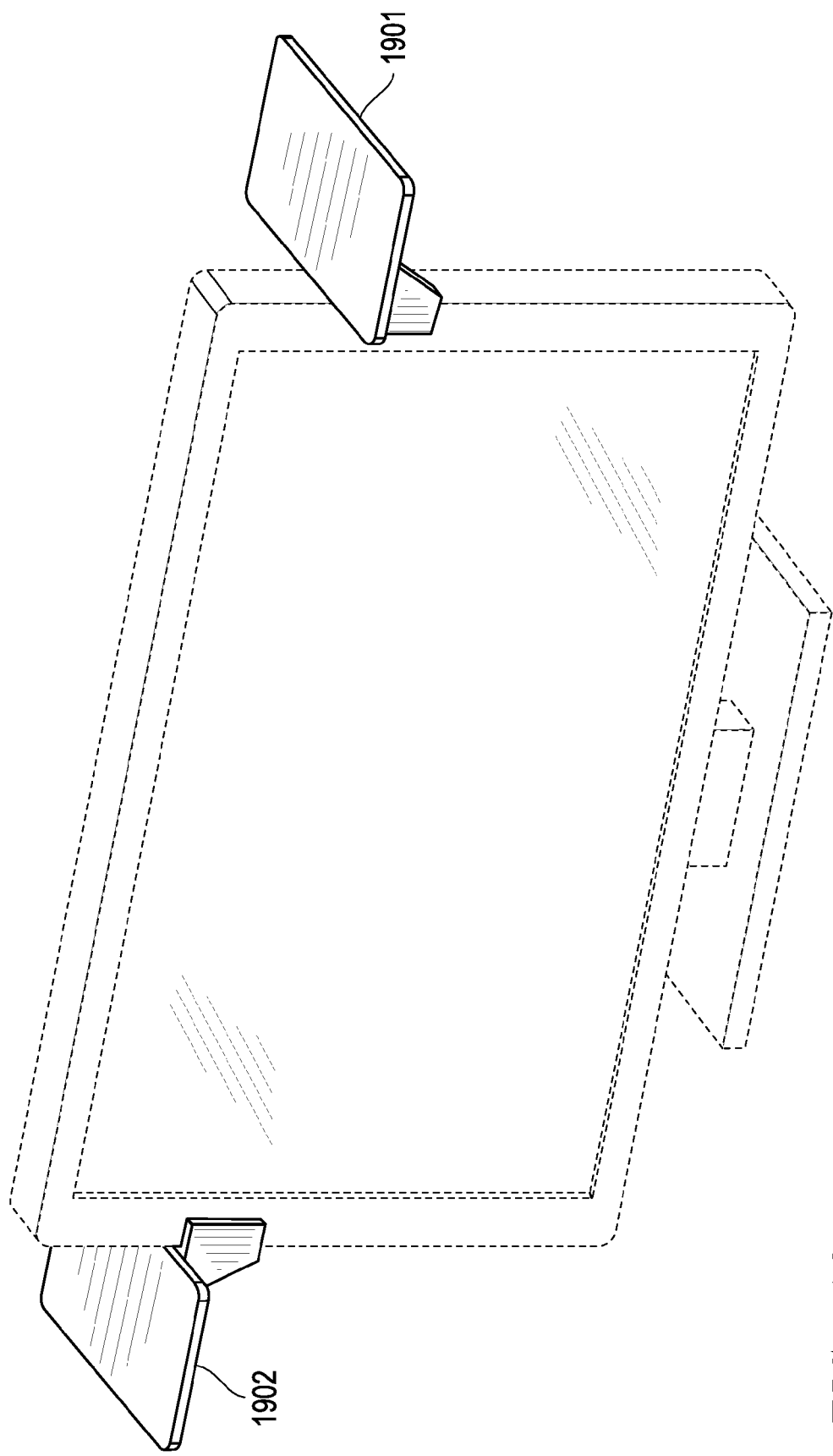
FIG. 19 shows a view of the current invention wherein two swivel shelves are currently being used at the same time.

FIG. 18 shows a top view of another embodiment having a swivel point 1801 for reversibility. The invention includes one support leg 1802, tightener 1803; attachment point 1804, a flat, horizontal resting area 1805, and swivel axis 1806 wherein attachments on the resting area 1805 guide the reversibility of the shelf from one side to the other so that the shelf can act both as a shelf for the left or right side of the monitor. The shelf swivel may be transferred to a horizontal swivel to transform a top shelf to a bottom shelf, as well (not shown). The stability of the shelf is dependent on the secure measure of the swivel point and the attachment point 1804 and the support legs 1802. The swiveling shelf can also be locked into place with conventional locking mechanism, such as an locking boll and hole configuration on the guided pathways or a conventional bar or lock to keep the resting area in one position (whether left, right, top, or bottom). FIG. 19 shows a view of the current invention wherein two swivel shelves 1901, 1902 are currently being used at the same time. As shown, there is no visibility of the swivel point from this perspective.

A detachable shelf for attachment to a TV or computer monitor is disclosed. It comprises a resting area having a horizontal area for the placement of remotes or various other attachments and a tightener for tightening the resting area to a TV or computer monitor and a support leg for attaching the tighteners to the resting area, and wherein the tighteners allow for the various attachment of sizes from 1 inch width support to 10 inch support. The detachable shelf also has capability for multiple tighteners for support of resting area to the TV or computer mount. The tighteners can be conventional screws or any conventional tightening system that locks onto the monitor while providing at up to 20 lbs of pressure. The support legs are angled so that the weight of the objects on the resting area does not alter the horizontal angle of the resting area even with 20 lbs of pressure. This is due to the configuration of the support leg and its ability to support weight to the side of the weight pressure point.

The detachable shelf can also have padded areas for the prevention of damage to monitor where the pressure from the tighteners will attach the resting area. The detachable shelf also has a swivel point for reversibility allowing the detachable shelf to be attached to both left and right side of the monitor. The detachable shelf also has a locking mechanism for the swivel capabilities so that the shelf can remain in place and provide support.

The detachable shelf has a capability for a resting area and a shelf to be placed on top of the TV monitor or computer monitor. The detachable shelf of can have a swivel point allowing the detachable shelf from being placed on top of the TV or computer monitor to the bottom of the computer monitor. The detachable shelf for attachment to a TV or computer monitor can comprise a resting area having a horizontal area for the placement of remotes or various other attachments, a tightener for tightening the resting area to a TV or computer monitor, a first support leg for attaching a tightener to the resting area, wherein the tightener allows for the various attachment of the resting area to various sized width support of monitors, including inch width support up to 10 inches, a second support leg for attaching the other end of the tightener, wherein the second support leg provides additional support for the resting area and a swivel point allowing the detachable shelf from being placed either opposite ends of the monitor and wherein the resting area maintains the ability to hold up to 20 lbs. of weight.

The detachable shelf can also have a resting area that is lockable to maintain one position of the swivel position. The detachable shelf can also have a resting area that swivels from the left side to the right side wherein the position of the resting area does not impede the vision of within 30 degrees from a horizontal plane of monitor. In another embodiment of the current invention, the detachable shelf can have a resting area swivels from the top side to the bottom side wherein the position of the resting area does not impede the vision of the viewer sitting in front of the monitor.

Although the present invention and its advantages have been described in detail, it should be understood that various changes, substitutions and alterations can be made herein without departing from the spirit and scope of the invention as defined by the appended claims. For example, although the receiving ends of these various connectors are substantially arranged in orthogonal angles to each other, other types of oblique angles are contemplated. The different angles can be made in accordance with the specific need. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A detachable shelf for attachment to a TV or computer monitor comprising:
   a resting area having a horizontal area for the placement of remotes or various other attachments;
   first and second support legs attached to a bottom surface of the resting area and substantially parallel to each other;
   one or more tighteners provided to one of the support legs for tightening the resting area to a vertical left or right side of a TV or computer monitor;

wherein the one or more tighteners attaches the resting area to the vertical left or right side of the TV or computer monitor having a width in the range of 1 inch to 10 inches, the support legs supporting the resting area in a substantially horizontal orientation when the one or more tighteners is tightened onto either a vertical front or rear surface of the TV or the computer monitor, and the other support leg contacts the other vertical front or rear surface of the TV or computer monitor; and a swivel point located between the one or more tighteners and the resting area and around which the resting area rotates, the plane of the resting area being perpendicular to the axis of the swivel rotation, the swivel point oriented such that the detachable shelf can be attached to the left or right vertical side of the TV or computer monitor.

2. The detachable shelf of claim 1 wherein the one or more tighteners are screws.

3. The detachable shelf of claim 1 having padded areas for the prevention of damage to the monitor where the pressure from the one or more tighteners will attach the resting area.

4. The detachable shelf of claim 1 in which the swivel point is configured for reversibility, allowing the detachable shelf to be attached to either the left or right side of the monitor.

5. The detachable shelf of claim 4 having a locking mechanism for the swivel capabilities so that the shelf can remain in place and provide support.

6. A computer monitor or a television screen, the computer monitor or television screen having a vertical edge to which is attached the detachable shelf of claim 1.

7. A computer monitor or a television screen, the computer monitor or television screen having a vertical edge to which is attached the detachable shelf of claim 3.

8. A computer monitor or a television screen, the computer monitor or television screen having a vertical edge to which is attached the detachable shelf of claim 4.

9. A computer monitor or a television screen the computer monitor or television screen having a vertical edge to which is attached the detachable shelf of claim 5.

10. A detachable shelf for attachment to a TV or computer monitor comprising:
  a resting area having a horizontal area for the placement of remotes or various other attachments;
  first and second support legs attached to a bottom surface of the resting area and substantially parallel to each other;
  one or more tighteners provided to one of the support legs for attaching the resting area to a vertical left or right side of a TV or computer monitor;
  wherein the one or more tighteners allows for the attachment of the resting area to the vertical left or right side of the TV or computer monitor with widths up to and including 10 inches and maintains the horizontal area of the resting area in a horizontal orientation when the one or more tighteners is attached to either a vertical front or rear surface of the TV or computer monitor, and the other support leg contacts the other vertical front or rear surface of the TV or computer monitor; and
  a swivel point around which the resting area rotates, the plane of the resting area being perpendicular to the axis of the swivel rotation and allowing the detachable shelf to be tightened to either the left or right side of the monitor and wherein the resting area maintains the ability to hold up to 5 lbs. of weight.

11. The detachable shelf of claim 10 where the swivel is lockable to maintain one position of the swivel position.

12. A computer monitor or a television screen the computer monitor or television screen having a vertical edge to which is attached the detachable shelf of claim 10.

\* \* \* \* \*